(12) United States Patent
Matsumori

(10) Patent No.: US 6,854,656 B2
(45) Date of Patent: Feb. 15, 2005

(54) SELF-SCANNING SYSTEM WITH ENHANCED FEATURES

(75) Inventor: Kunihiko Matsumori, Tokyo (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 10/434,135

(22) Filed: May 8, 2003

(65) Prior Publication Data

US 2004/0222302 A1 Nov. 11, 2004

(51) Int. Cl.[7] ................................................ G06K 7/10
(52) U.S. Cl. .................. 235/472.01; 235/492; 235/487; 235/380; 235/383; 235/375; 705/26; 705/27; 705/23
(58) Field of Search ................................ 235/492, 487, 235/472.01, 380, 383, 375, 385, 454, 462.01, 462.13, 462.45, 462.46, 472.02; 705/26, 27, 23, 28, 41, 64, 16, 17, 20, 21

(56) References Cited

U.S. PATENT DOCUMENTS

| 3,991,299 A | 11/1976 | Chadima, Jr. et al. |
| 4,095,091 A | 6/1978 | Nakano |
| 4,751,375 A | 6/1988 | Ravizza |
| 4,902,883 A | 2/1990 | Poland |

(List continued on next page.)

FOREIGN PATENT DOCUMENTS

GB        2 339 944 A        9/2000

*Primary Examiner*—Jared J. Fureman
*Assistant Examiner*—Allyson N Trail
(74) *Attorney, Agent, or Firm*—Christie, Parker & Hale, LLP

(57) ABSTRACT

A self-scanning system including a mobile personal shopping terminal having enhanced features. A bar code scanner coupled to the terminal is disabled for a period of time after a scanning activity to prevent the inadvertent scanning of the same item two or multiple times. The time period varies based on the user's profile information. When a single item is nonetheless scanned two or more times, the terminal notifies the user of this fact. Usage of the terminal is also monitored to detect a user that has trouble finding an item within the retail facility. A store clerk may approach such a user and volunteer assistance. Furthermore, kiosk functions are incorporated into the terminal for providing the user information and business opportunities with the retail store. For example, the retail store may allow the user to purchase an audio piece that is being broadcast at the store using the terminal. The terminal may also be used to purchase recycled/used items that are placed for sale by individuals through the retail store.

21 Claims, 11 Drawing Sheets

U.S. PATENT DOCUMENTS

| | | | |
|---|---|---|---|
| 4,929,819 A | 5/1990 | Collins, Jr. | |
| 5,250,789 A | 10/1993 | Johnsen | |
| 5,274,610 A | 12/1993 | Tonomura et al. | |
| 5,336,874 A | 8/1994 | Hasegawa | |
| 5,382,779 A * | 1/1995 | Gupta | 235/383 |
| 5,473,148 A | 12/1995 | Tanaka et al. | |
| 5,572,653 A * | 11/1996 | DeTemple et al. | 345/501 |
| 5,708,418 A | 1/1998 | Ushida et al. | |
| 5,729,697 A | 3/1998 | Schkolnick et al. | |
| 5,734,839 A | 3/1998 | Enoki et al. | |
| 5,804,807 A | 9/1998 | Murrah et al. | |
| 5,825,002 A * | 10/1998 | Roslak | 235/375 |
| 5,859,414 A * | 1/1999 | Grimes et al. | 235/383 |
| 5,877,485 A * | 3/1999 | Swartz | 235/383 |
| 5,887,271 A | 3/1999 | Powell | |
| 5,898,158 A | 4/1999 | Shimizu et al. | |
| 5,929,425 A | 7/1999 | Kanno | |
| 5,979,757 A * | 11/1999 | Tracy et al. | 235/383 |
| 5,992,752 A | 11/1999 | Wilz, Sr. et al. | |
| 6,000,610 A | 12/1999 | Talbott et al. | |
| 6,024,281 A | 2/2000 | Shepley | |
| 6,026,377 A | 2/2000 | Burke | |
| 6,042,007 A | 3/2000 | Nugent, Jr. et al. | |
| 6,092,725 A * | 7/2000 | Swartz et al. | 235/383 |
| 6,129,274 A * | 10/2000 | Suzuki | 235/381 |
| 6,179,206 B1 * | 1/2001 | Matsumori | 235/383 |
| 6,386,450 B1 * | 5/2002 | Ogasawara | 235/383 |
| 6,507,279 B2 * | 1/2003 | Loof | 340/572.1 |
| 6,577,275 B2 * | 6/2003 | Turner | 342/465 |
| 6,672,506 B2 * | 1/2004 | Swartz et al. | 235/383 |
| 2001/0015375 A1 * | 8/2001 | Swartz et al. | 235/383 |
| 2002/0002504 A1 * | 1/2002 | Engel et al. | 705/26 |
| 2002/0077937 A1 * | 6/2002 | Lyons et al. | 705/28 |
| 2002/0133545 A1 * | 9/2002 | Fano et al. | 709/203 |
| 2002/0147642 A1 * | 10/2002 | Avallone et al. | 705/14 |
| 2002/0178088 A1 * | 11/2002 | Lurie et al. | 705/26 |
| 2003/0102373 A1 * | 6/2003 | Swartz et al. | 235/383 |
| 2003/0158796 A1 * | 8/2003 | Balent | 705/28 |
| 2004/0050922 A1 * | 3/2004 | Gauthier et al. | 235/375 |

* cited by examiner

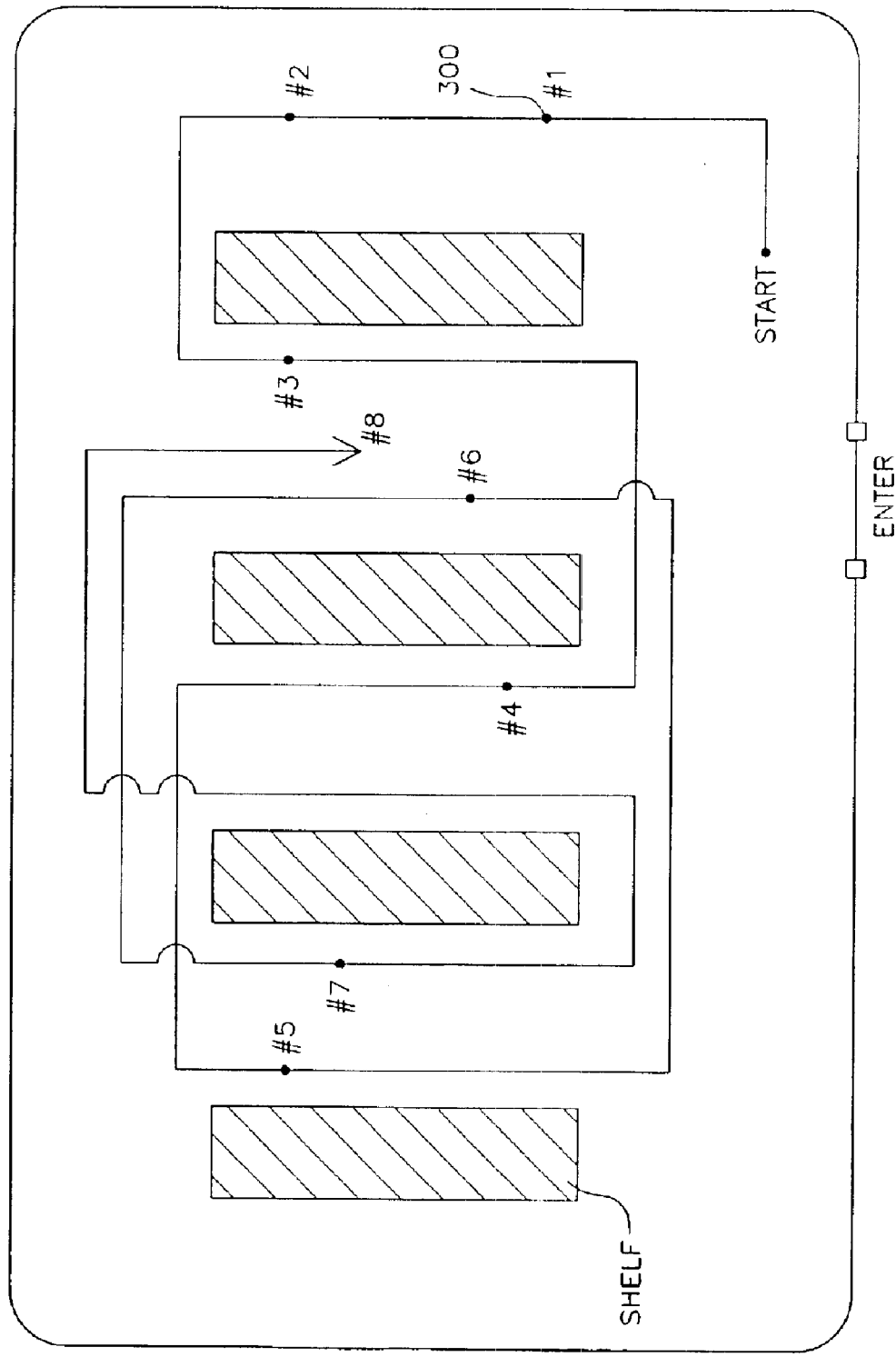

SELF-SCANNING SYSTEM WITH ENHANCED FEATURES

This application is related in subject matter to the subject matter disclosed in U.S. Pat. No. 6,179,206, the content of which is incorporated herein by reference.

FIELD OF THE INVENTION

This invention relates generally to electronic shopping systems, and more particularly, to an electronic shopping system aimed to provide an enhanced shopping experience at a retail facility.

BACKGROUND OF THE INVENTION

Contemporary retail stores compete fiercely to attract new customers to their stores and maintain the store loyalty of their present customers. One mode of attraction is by offering a personalized service which is adapted to meet the particular expectations and needs of each member of a highly diversified clientele. Another mode of attraction is to provide some form of computerization or electronic technology, such as self-scanning systems or POS (point-of-sale) systems, to speed and facilitate the shopping experience.

The existing systems and programs designed to provide the personalized service and shopping facilitation, however, leave a lot to be desired. For instance, although self-scanning systems exist to aid customers to speed the check-out process, a customer may inadvertently scan the same item two or multiple times due to his or her inexperience with the utilization of the system, resulting in the customer having to pay for the same item as many times as the item was scanned. Furthermore, existing self-scanning and POS systems do not aid the actual shopping process. A customer may still continue to spend a considerable amount of time trying to locate the items that need to be purchased. Furthermore, current electronic shopping systems do not aid a customer in taking advantage of all the services available to the customer through the retail store. Accordingly, there is a need for an electronic shopping system that will provide to a customer an enhanced shopping experience while at a retail facility.

SUMMARY OF THE INVENTION

According to one embodiment, the present invention is directed to a mobile shopping terminal that includes a control unit and a scanner coupled to the control unit. The control unit retrieves profile information associated with a user, identifies a time period based on the profile information, detects a first scanning activity by the scanner, and disables the scanner for the identified time period in response to detecting the first scanning activity prior to enabling a second scanning activity.

According to another embodiment, the present invention is directed to a store server for use in a retail facility where the store server includes means for recording an activity of a mobile shopping terminal used by a user, a processing unit coupled to the means for recording, the processing unit configured to analyze the activity and determine whether assistance should be provided to the user based on the analyzed activity, and a means for transmitting user profile information to a store terminal accessible to a store clerk in response to a determination that assistance should be provided to the user, the user profile information including data for identifying the user to whom assistance is to be provided.

According to a further embodiment, the present invention is directed to an electronic shopping system for use in a retail facility where the system includes a store computer maintaining information on an item for sale by a seller and a mobile shopping terminal coupled to the store computer, the mobile shopping terminal including a scanner for self-scanning of items desired for purchase by a user. The store computer transmits information on the item for sale by the seller to the mobile shopping terminal and the mobile shopping terminal displays the information on a display. Upon an indication by the user to purchase the displayed item, the mobile shopping terminal inserts the item into a list of items that have been self-scanned by the user and the store computer notifies the seller of the sale.

In a further embodiment of the invention, the electronic shopping system includes a store computer maintaining information on a plurality of audio pieces, a broadcast system broadcasting an audio piece selected by the store computer, and a mobile shopping terminal. The mobile shopping terminal includes a scanner for self-scanning of items desired for purchase by a user, means for receiving from the store computer information on the audio piece broadcast by the broadcast system, a user input receiving a user command to purchase the broadcast audio piece, and a control unit inserting the audio piece into a list of items that have been self-scanned by the user in response to the user command.

In yet another embodiment, the present invention is directed to a computer-implemented method for controlling the use of a scanner coupled to a mobile shopping terminal. The method includes retrieving profile information associated with a user of the scanner, identifying a time period based on the profile information, detecting a first scanning activity by the scanner, and disabling the scanner for the identified time period in response to detecting the first scanning activity prior to enabling a second scanning activity.

In another embodiment, aid is provided to a user of a mobile shopping terminal coupled to a scanner by recording an activity of the mobile shopping terminal, analyzing the activity by a processing unit, determining whether assistance should be provided to the user based on the analyzed activity, and transmitting user profile information to a store terminal accessible to a store clerk in response to a determination that assistance should be provided to the user, the user profile information including data for identifying the user to whom assistance is to be provided.

In another embodiment, a method for electronic shopping via a mobile shopping terminal includes displaying on the display a list of items that have been self-scanned by the user using the scanner, receiving information on the item submitted for sale by the seller, displaying the information on the display, receiving a user indication to purchase the displayed item; and in response to the user indication, inserting the item into the list of items that have been self-scanned by the user and notifying the seller of the sale.

In a further embodiment, a method for electronic shopping via a mobile shopping terminal includes broadcasting via the broadcast system an audio piece selected by the store computer, receiving from the store computer information on the audio piece broadcast by the broadcast system, displaying the information on the display, displaying on the display a list of items that have been self-scanned by the user using the scanner, receiving a user command to purchase the broadcast audio piece, and inserting the audio piece into the list of items that have been self-scanned by the user in response to the user command.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 5 is an exemplary shopping route that is detected by a network server in the electronic personal shopping system of FIG. 1, according to one embodiment of the invention;

DETAILED DESCRIPTION

Figure 1:
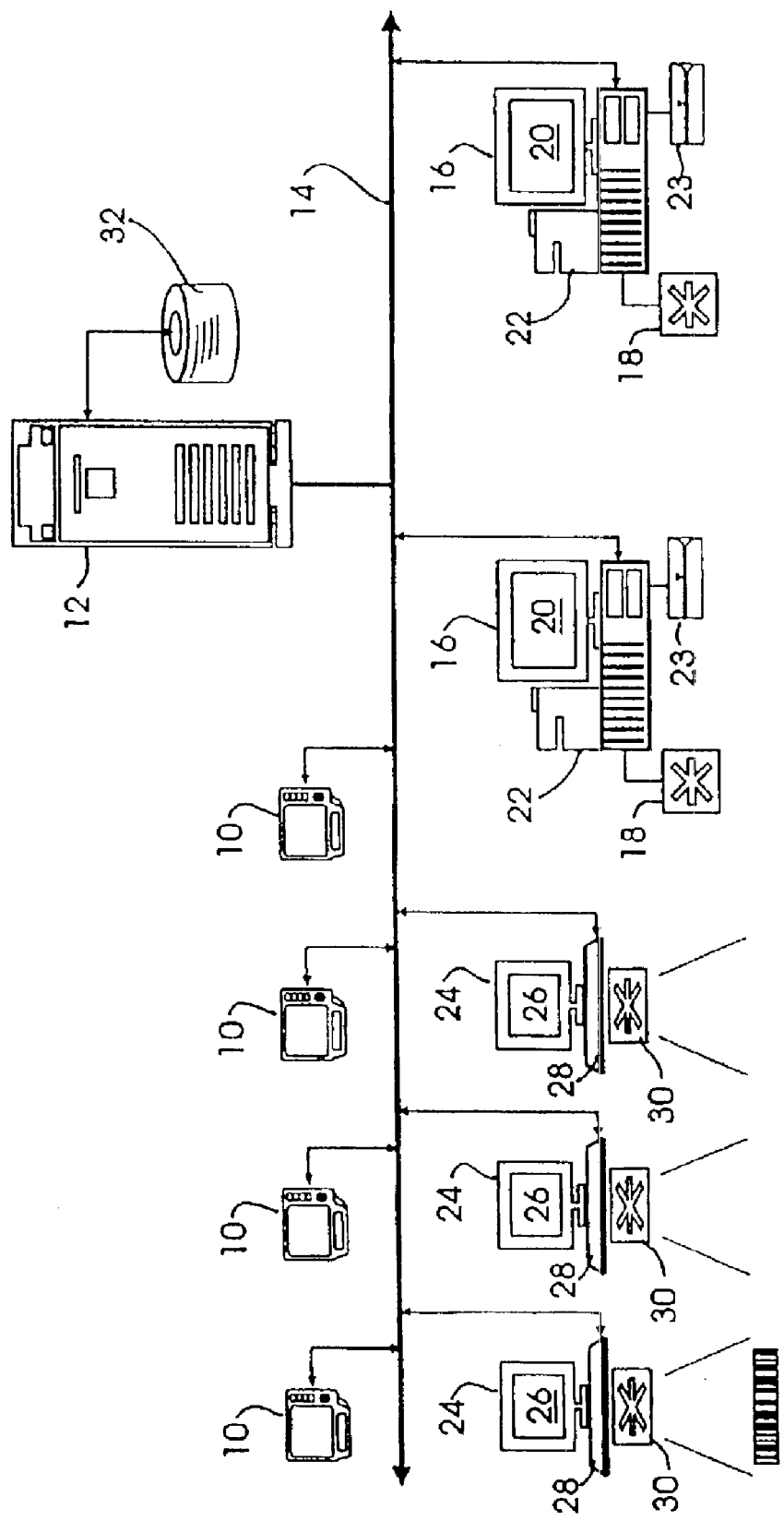
FIG. 1 is an exemplary simplified semi-schematic block diagram of an electronic personal shopping system according to one embodiment of the present invention.

FIG. 1 is an exemplary simplified semi-schematic block diagram of an electronic personal shopping system according to one embodiment of the present invention. The system includes a customer operated, movable or mobile personal shopping terminals 10 electronically connected to a network server or store platform computer system 12 via a network signal bus 14, that is configured to support and operate as a local area network (LAN). The local area network may support a LAN communication medium, such as Ethernet or Token Ring. The Ethernet LAN communication medium is not limited to 10 megabit Ethernet, but may include other variants, such as Past Ethernet, Gigabit Ethernet, 10 Gigabit Ethernet, and wireless Ethernet. In the illustrated embodiment, the network server 12 communicates with the mobile personal shopping terminal 10 via the network signal bus 14 by accessing the appropriate terminal address along the local area network's communication backbone, according to conventional mechanisms. In addition, the network server 12 communicates with the mobile personal shopping terminal 10 in a wireless manner via RF signals.

According to the embodiment illustrated in FIG. 1, the network signal bus 14 is also able to host and support bi-directional communication between the network server 12 and point-of-sale (POS) terminals 16, such as would normally be provided at customer check-out lanes. In contrast to mobile personal shopping terminals 10 that are operated by customers (shoppers), POS terminals 16 are normally operated by store personnel in a conventional fashion. POS terminals are typically computer-based, microprocessor operated sales terminals that sense, identify and register items being purchased by scanning an item's barcode with a barcode scanner 18. As each item is scanned, the item's SKU number, item description and the item price are displayed on an integral display screen 20 for easy and convenient viewing and verification by the scanning clerk and the customer. A keyboard or keypad (neither of which are shown) is also typically provided in order that the scanning clerk might manually enter the SKU number of an item which is unable to have its barcode read for any reason. Point-of-sale terminals further conventionally include a receipt printer 22 and a cash drawer (not shown). With the advent of credit cards, ATM cards, shopping club cards, and the like, modern POS terminals are further conventionally provided with magnetic-stripe-reader (MSR) devices 23, PINPADs, automatic coin-changers, and other similar optionally provided convenience appliances. Point-of-sale terminals 16 are coupled to the store's network server 12 through a suitable interface to the network signal bus 14.

Provision is made in the exemplary system configuration of FIG. 1, for coupling additional terminal types to the network signal bus 14 such that they might interface with the store network server 12. These additional terminal types, identified generally at 24, may include self checkout terminals, store PC-based work stations, kiosk terminals, and the like. These additional terminals 24 are all configured to include at least a display screen 26, some form of I/O device 28, such as a keyboard, keypad, and the like, and a barcode scanner 30 for scanning a merchandise item's UPC number and affecting purchase transactions.

In accordance with the exemplary system configuration of FIG. 1, the network server 12 (or alternatively a store host platform computer) includes a mass storage device 32, such as a hard disk drive, or drive array, which hosts a number of purpose-built databases and files useful for implementation of the system of the present invention. Particular such databases and files include a Price Look-up File (PLU), a transaction log file, an advertisement database, a news database, a recycled/used goods database, an auction database, a music database, and a customer database with demographic, personal preference, personal profile and other information specific to each customer. In the case where the mass storage unit 32 is configured to include a customer database, it should be noted that each particular customer's data record is identified by and associated with a unique customer identification number, termed a customer ID. Each customer's ID number is hosted on a customer ID card which, when presented, identifies that customer and enables either a clerk-operated POS terminal or a customer operated mobile personal shopping terminal to access that customer's data record from the network server's mass storage unit 32.

Figure 2:
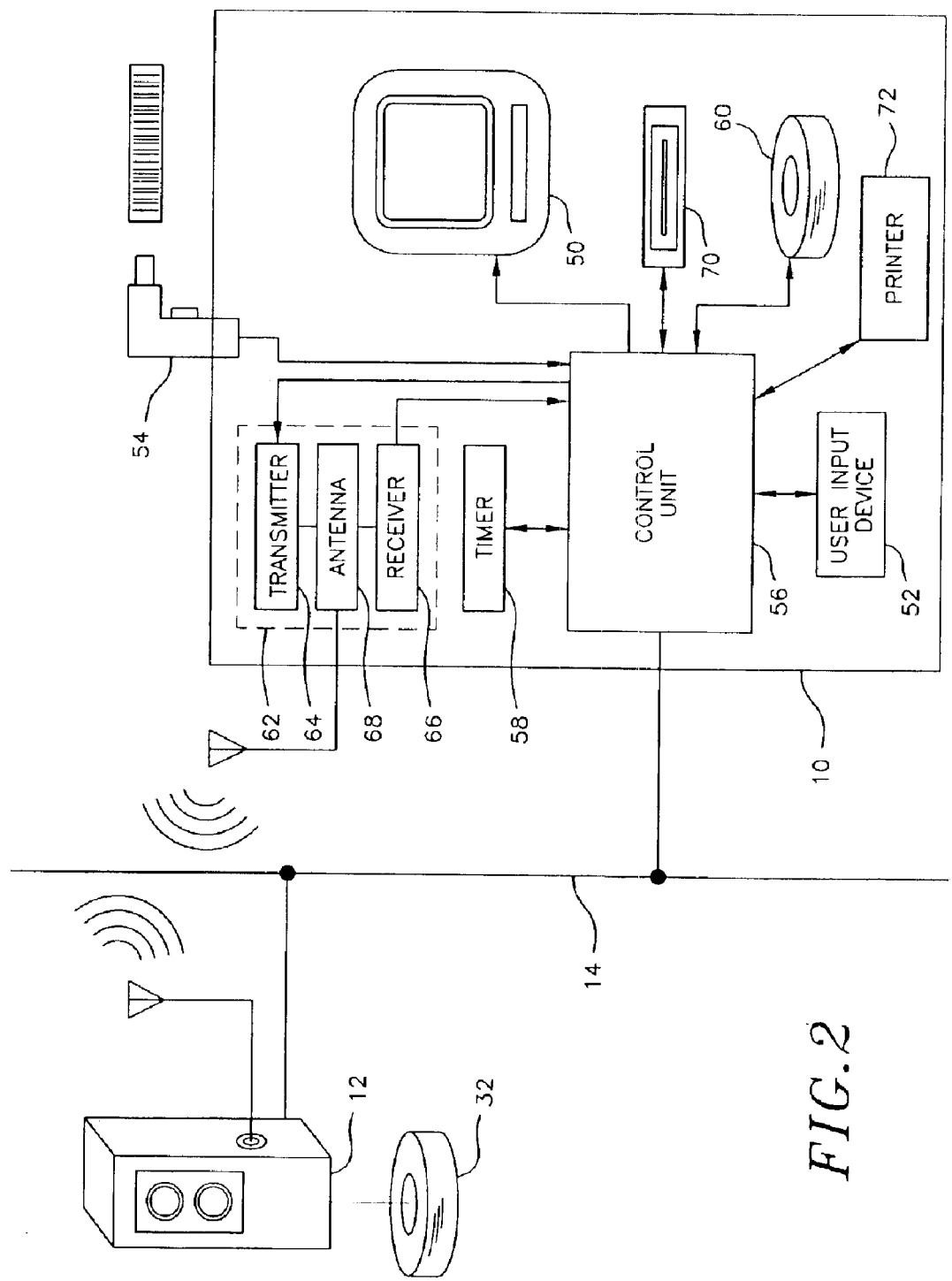
FIG. 2 is a semi-schematic block diagram of a mobile personal shopping terminal in the electronic personal shopping system of FIG. 1 according to one embodiment of the invention.

FIG. 2 is a semi-schematic block diagram of the mobile personal shopping terminal 10 according to one embodiment of the invention. The personal shopping mobile terminal 10 may be configured as a hand-held apparatus, easily carried by a typical shopper, or may be mounted on or affixed to the handle portion of a shopping cart (not shown) of the type furnished shoppers for use in a typical retail facility.

The terminal 10 suitably includes a display screen 50 that may take the form of a VGA or SVGA liquid-crystal-display (LCD) screen, an LED display screen, or any other suitable display apparatus conventional in the art. Pressure sensitive (touch screen) technology may be incorporated into the display 50 so that a shopper may access the mobile terminal 10 by merely touching certain portions of the screen. In addition, a numeric or alpha-numeric button or keypad arrangement may be provided in combination with the display 50 in order to define an input device 52.

The mobile personal shopping terminal 10 further includes a barcode reader or scanner device 54 that is conventionally configured to scan an item's universal product code (UPC) provided either on a product itself or in a convenient location proximate to the product. The display 50 and bar code scanner 54 are coupled to a microprocessor based control unit 56, operating under firmware or software program control, for performing any needed processing functions and for controlling operation of the display 50 and the bar code scanner 54.

A scanning interval timer 58 is further coupled to the control unit 56 to control the scanning interval of the bar code scanner 54. For each scanning action, the bar code scanner is disabled for the period of time measured by the timer before enabling a next scanning action. This helps prevent a customer from inadvertently scanning the same item two or multiple times. According to one embodiment of the invention, the timer 58 is a programmable timer integrated into the scanner 54.

A local storage apparatus 60 is further and optionally coupled to the control unit 56 and provides a local memory storage area for holding various data and tables until such time as the data is required for processing by the control unit. The local storage 60 may suitably comprise a small form factor hard disk drive, a PCMCIA programmable memory card, a high-capacity flexible media cartridge and floppy drive combination, an array of FROM (Flash ROM), SRAM or DRAM memory chips, or the like.

In addition, the control unit 56 may be coupled to a printer 72 for printing any information stored in the local storage apparatus or displayed on the display.

Communication between the mobile personal shopping terminal 10 and an external information source terminal such as the store network server 12 may be implemented in a wired manner via the network signal bus 14, or in a wireless manner via a wireless communication transceiver 62 that is configured to transmit and receive RF signals between the control unit 56 and a similar transceiver hosted by the store network server. The wireless communication transceiver 62 suitably includes transmitter 64 and receiver 66 circuits coupled to an RF antenna 68 for effectuating the wireless communication.

It should be recognized by those having skill in the art, that a wireless transceiver need not be directly affixed to the network server 12. Rather, a plurality of RF transceivers may be located at periodic intervals throughout the retail facility and connected to the server through a local-area-network (LAN) array configuration, an arbitrated loop, or any other of a variety of conventional client-server topologies. Alternatively, communication between the network server 12 and a distributed array of RF transceivers may be accomplished, for example, by time division multiple access (TDMA), frequency division multiple access (FDMA), or any other suitable method which avoids interference while communicating with multiple transceiver units. In any of the foregoing configurations, it should be evident to one having skill in the art that the mobile personal shopping terminal 10 will be capable of communicating with a retail facility's core server, regardless of the location of a shopper using the terminal and regardless of the size of the retail facility.

An additional I/O device is provided on the mobile personal shopping terminal 10 in the form of an IC card interface unit 70, configured to read information from and write information to an IC, or smart card. The IC card and card interface unit 70, in combination, provide a suitable mechanism for a customer to transport pertinent data to and from a retail facility and exchange that pertinent data with the facility through use of the mobile personal shopping terminal 10. While referred to as an IC card, the card is a personal memory card or data card which looks and feels much like an ordinary credit card. The IC card may be either contact based or contactless. The simplest contact-type card might be a magnetic tape storage stripe affixed in a particular location on its reverse side. Alternatively, a contact or contactless IC card may include a microprocessor, an electrically erasable field-programmable read-only memory (EEPROM), a Flash ROM (FROM) and, optionally, circuitry for inductively receiving an RF power signal. In addition, the IC card is capable of capacitively transferring data signals between the card and the IC card interface unit 70 and may be interrogated, programmed or reprogrammed by read/write circuitry included in the card interface 70.

According to one embodiment of the invention, the IC card stores and maintains a purchase transaction history of self-scanned items in real-time, making a customer's transaction data available to the store during checkout. A customer's most recent transaction data may be used to compute loyalty or incentive points based on a running total of a particular customer's purchases, allocation of in-store promotional coupons, and the like.

Payment, in accordance with one embodiment of the invention, is performed either through the mobile personal shopping terminal 10 or by clerk-assisted payment at a check out counter or POS terminal 16. Even if the clerk-assisted payment option is chosen by a customer, the check-out procedure is made efficient because all item scanning has already been performed and the customer's shopping transaction data is readily available at the payment terminal by merely scanning the appropriate customer ID card.

I. Self Scanning Assistance

According to one embodiment of the invention, the mobile personal shopping terminal 10 assists customers during the self-scanning process by helping to prevent the inadvertent scanning of the same item two or multiple times. When a single item is nonetheless scanned two or more times, the mobile personal shopping terminal 10 notifies the customer of this fact, allowing the customer to correct any mistakes that may have been made during the scanning process.

According to one embodiment of the invention, the mobile personal shopping terminal 10 helps to prevent the inadvertent scanning of the same item two or more times by disabling the bar code scanner 54 during scanning intervals for a pre-determined period of time. The time period may be set for each customer based on the customer's personal profile data. Such profile data may include a history of the customer's self-scanning experience as well as other pertinent profile information such as age, education, and the like.

For example, the history of the customer's self-scanning experience may include a history of duplicative scans that are recorded during a transaction that are subsequently deleted by the customer. The self-scanning experience information may also include the number of times that the customer has used the mobile personal shopping terminal 10. This information may be used as an indication of the level of experience of the customer with the terminal 10. The scanning time interval may be calculated based on the level of experience of the customer via a formula that sets the interval for a customer with a low level of experience to be higher than the interval for a user with a high level of experience. The calculated scanning time interval information and or level of experience may then be stored in the customer's profile data. The customer may also manually set the scanning time interval using the user's input device 52.

Figure 3:
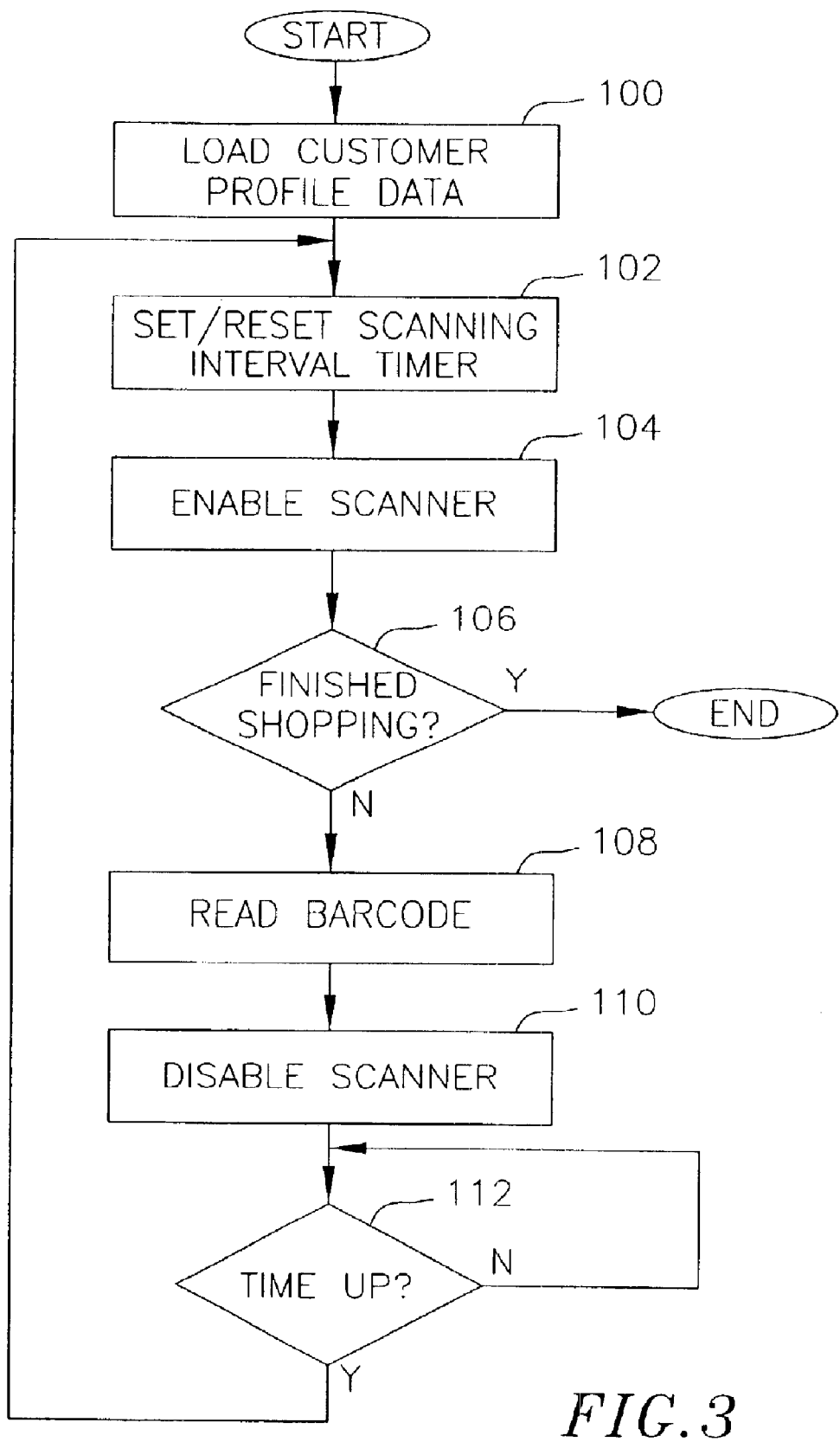
FIG. 3 is a flow diagram of an exemplary process for helping to prevent inadvertent duplicate scans with the mobile personal shopping terminal according to one embodiment of the invention.

FIG. 3 is a flow diagram of an exemplary process for helping to prevent inadvertent duplicate scans according to one embodiment of the invention. The process starts, and in step 100, the customer profile data is provided to the control unit 56. The profile data may be obtained from the customer's IC card via the IC card interface unit 70 and then provided to the control unit. The profile data may also be obtained from the customer database in the network server's mass storage unit 32 based on ID information that is either typed-in by the customer using the input device 52 or obtained from the IC card.

If the loaded customer profile data includes the time period for setting the scanning interval timer 58, the control unit sets the scanning interval timer according to the loaded profile data in step 102. If the loaded customer profile data only includes the customer's scanning-history and other data that may be used to calculate the time period, the control unit 56 invokes an algorithm for calculating the time period and sets the scanning interval timer accordingly.

In step 104, the control unit 56 enables the bar code scanner 54. In step 106, the control unit 56 determines if the customer has finished shopping. This may be verified, for instance, upon a user selection of a "checkout" button on the mobile personal shopping terminal.

If the customer is not finished shopping, the customer uses the bar code scanner 54 in step 108 to read a bar code of an item to be purchased. Upon the detection of the scanning activity, the control unit 52 transmits a disable signal to the bar code scanner 54 for disabling the bar code scanner from further scans in step 110. At about the same time, the control unit 52 transmits a signal to the scanning interval timer 58 to allow the timer to run. In step 112, a determination is made as to whether the time in which the bar code scanner is to be disabled is up. If the answer is YES, the scanning interval timer 58 is reset, and the scanner is enabled for another scanning activity.

According to the embodiment where the timer 58 is a programmable timer integrated into the scanner, a person skilled in the art should recognize that steps 102 to 112 may be replaced and/or include a step that transmits a "set interval timer" command to the bar code scanner to set or reset the programmable timer.

Regardless of the embodiment being used, the personalized control of the timing of the scanner allows a person with less experience with self-scanning systems to be less subject to the inadvertent scanning of the same item two or more times.

According to one embodiment, if a single item is nonetheless scanned on multiple occasions, the mobile personal shopping terminal 10 notifies the customer of such duplicative scans. According to one embodiment of the invention, the display screen 50 of the terminal 10 displays a transaction log with information on each scanned item. Upon the detection of an item that has been scanned before, either consecutively or non-consecutively, the control unit 56 causes the display screen to display the duplicative entry or entries for the item in a visually distinguished manner. For example, the entries may be highlighted, displayed in a color that is different than the other entries, displayed in a blinking or flashing manner, or the like. The duplicative entry or entries are similarly visually distinguished when the transaction log is printed using the printer 72 or 23. In this manner, the customer may quickly identify the duplicative scans from the display screen or printed receipt, and take corrective measures if a mistake has been made prior to the payment of the scanned items. Such corrective measures may include deleting the duplicative item from the list.

Figure 4:
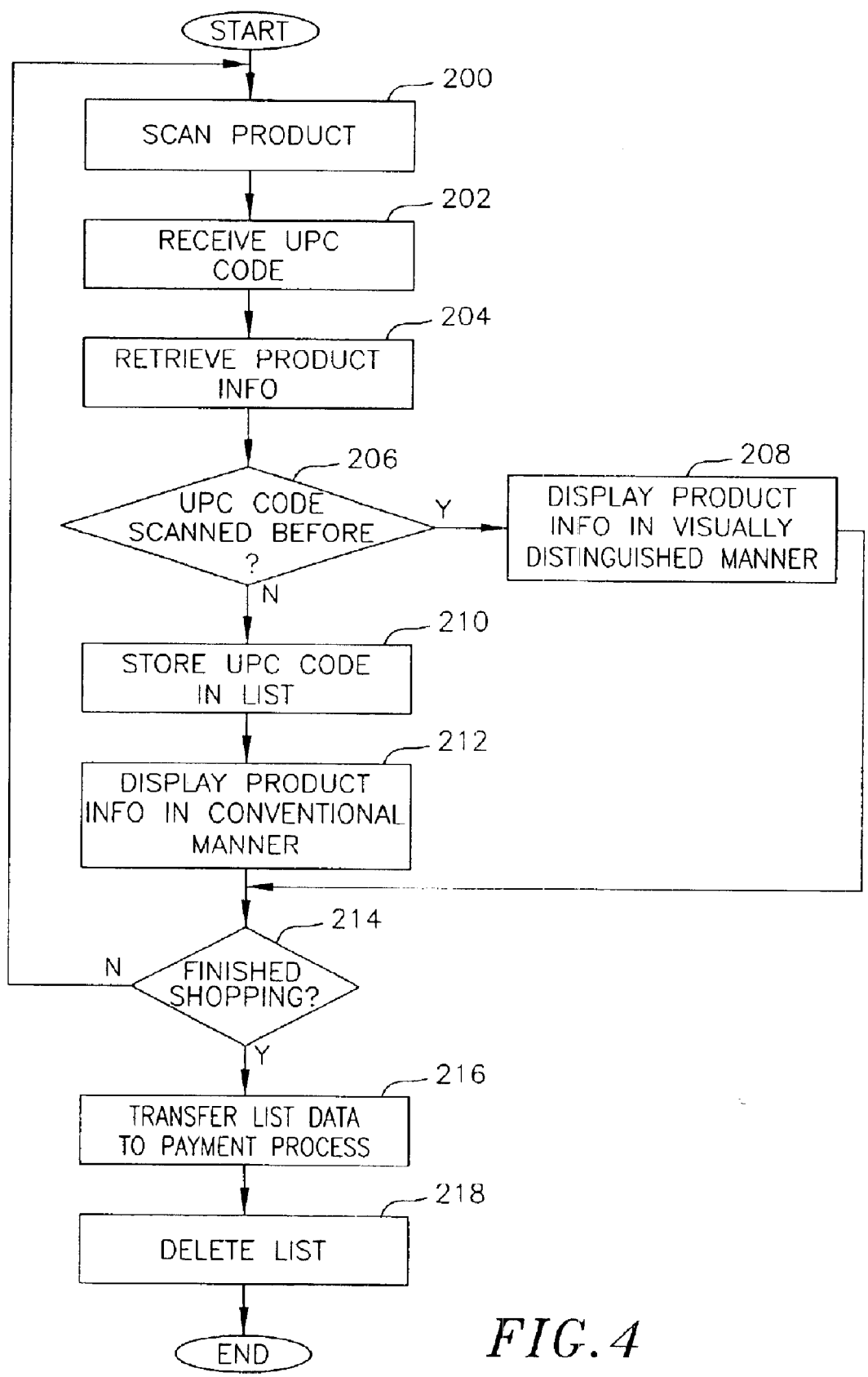
FIG. 4 is a flow diagram of a process for alerting a customer of a duplicate scan according to one embodiment of the invention.

FIG. 4 is a flow diagram of a process for alerting a customer of a duplicate scan according to one embodiment of the invention. The process starts, and in step 200, the customer scans a product during a current shopping excursion. In step 202, the control unit 56 receives a UPC code of the scanned product and in step 204, retrieves information associated with the product from the network server's mass storage unit 32. In this regard, the control unit 56 forwards all or a portion of the code to the network server 12. The network server 12 invokes a search and retrieval subroutine which enters the server's mass storage unit 32 and searches a PLU table for the scanned item's code. Once a match is made, the network server 12 transmits the information contained in the PLU table to the mobile personal shopping terminal 10.

In step 206, the control unit 56 determines whether the UPC code has been scanned before. The control unit may do this, for example, by searching a list of UPC codes that have been scanned so far, and determining whether the currently scanned UPC code exists in the list. If the UPC code does not appear in the list, the item has not been scanned before, and the code of the item is stored in the list of scanned codes in step 210. In step 212, the retrieved product information is displayed on the display screen 50 in a conventional manner.

Otherwise, if the UPC code appears in the list of scanned codes, the control unit signals the display screen to display the product information in a visually distinguished manner in step 208.

In step 214, a determination is made as to whether the customer has indicated that he or she is finished shopping. The user may do so by selecting, for instance, a checkout button on the display screen 50. If the answer is YES, the list is forwarded to a payment process or transferred to a POS terminal in step 216 to process the payment of the scanned items and the list of scanned codes is deleted in step 218, allowing a new list to be created for a next shopping transaction.

II. Improved Shopper Assistance

According to one embodiment of the invention, assistance is provided to a user of the mobile personal shopping terminal 10 who may have trouble finding a particular item within the retail facility. If such a person is identified, a store clerk may approach the user and volunteer assistance, or a message may be displayed on the display screen 50 of the mobile personal shopping terminal 10 asking if the user needs assistance. Such a personalized service helps create bigger customer satisfaction and maintain the loyalty of existing customers as well as attract new customers to the retail facility.

According to one embodiment of the invention, the network server 12 monitors the use of each mobile personal shopping terminal 10 during a current shopping transaction. The network server 12 collects and analyzes information on when and where the mobile personal shopping terminal 10 was used. For example, the network server 12 may monitor the location of scanned items and map a route of the customer based on this information. The network server 12 may also collect and analyze information on the amount of time elapsed between scans without any activity from the mobile terminal. The longer the time elapsed without any other type of activity, the more likely that the customer is not finding an item that he or she is looking for.

FIG. 5 is an exemplary shopping route that is detected by the network server 12 based on the scanning activities of a user of the mobile personal shopping terminal 10. Each location where a scanning activity occurred is marked with a reference numeral 300 that indicates when the activity occurred in comparison to a previous activity. By analyzing this shopping route, the network server 12 may detect that the customer is walking around in an ineffective route, possibly because the customer is having trouble finding certain items in the store, and alert a store clerk to provide assistance to the customer. The network server 12 may alternatively first inquire from the customer whether such assistance is desired. A store clerk is dispatched to the customer if the customer indicates that assistance is desired.

If a store clerk is to be dispatched, the network server 12 transmits information to a store clerk's handheld terminal (not shown) or store terminal 24 as to the possible location of the shopper and a description of the shopper. The description may include a photograph of the shopper retrieved from the customer database and/or identifying characteristics of the shopper such as, for example, the customer's eye color, hair color, height, weight, age, gender, and the like. This allows the store clerk to easily locate a customer who may be in need of the assistance. The store clerk responding to the call may transmit a message via the handheld terminal or store terminal that the call is being handled and inform the other store clerks of this fact to avoid duplicate responses to the same call.

Figure 6A:
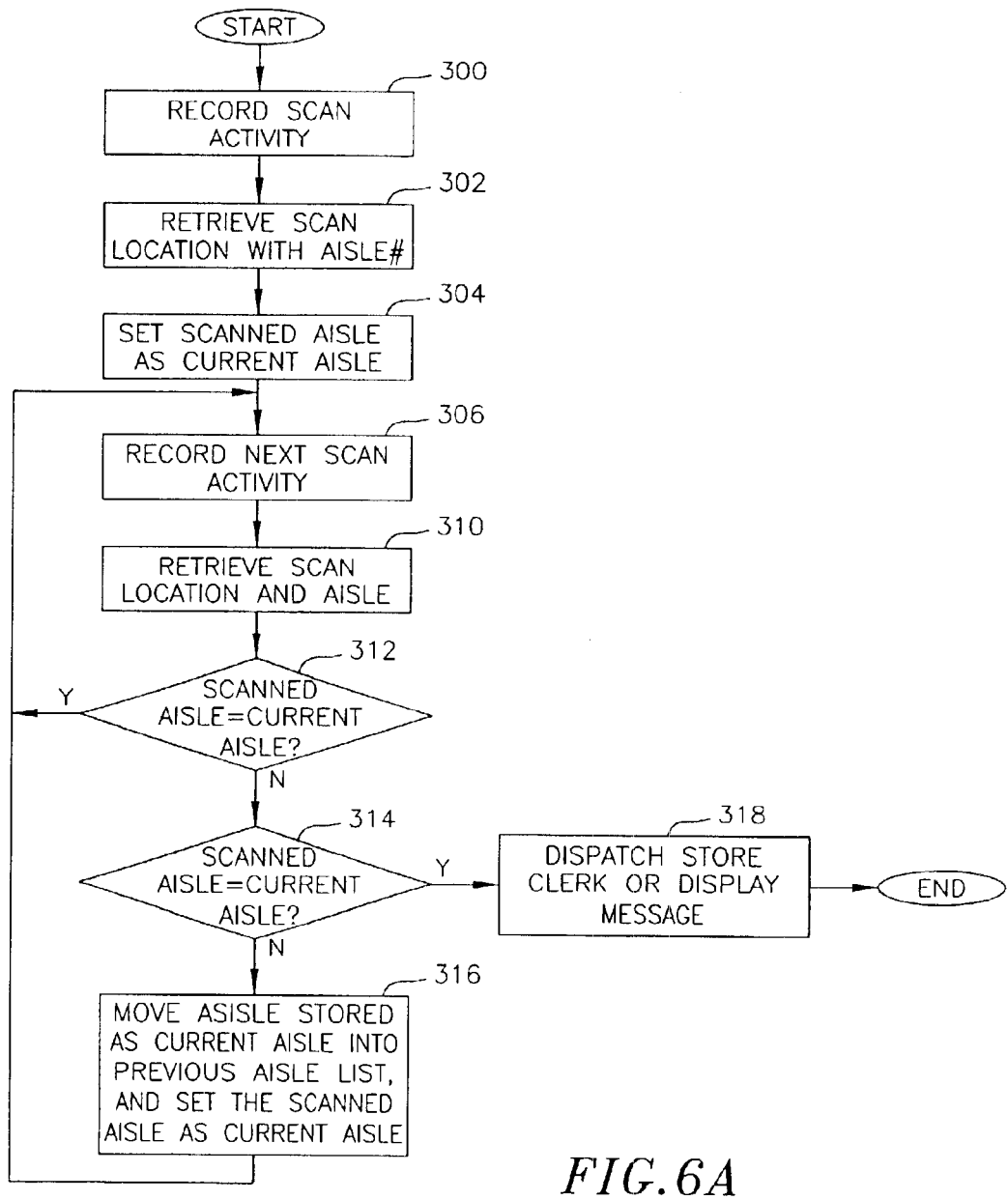
FIG. 6A is a flow diagram of a process for identifying and providing assistance to shoppers detected by the network server of FIG. 5 as potentially needing such assistance according to one embodiment of the invention.

FIG. 6A is a flow diagram of a process for identifying and providing assistance to shoppers detected by the network server 12 as potentially needing such assistance according to one embodiment of the invention. The process starts, and in step 300, a processing unit within the network server 12 records a scan activity by a particular customer using the bar code scanner 54. In step 302, the processing unit retrieves location information of the scanned product from the PLU database stored in the mass storage unit 32. According to one embodiment of the invention, the location information includes an aisle number. In step 304, the processing unit sets the aisle number of the scanned item as the current aisle.

In step 306, the processing unit records a next scan activity. In step 310, the processing unit retrieves the location information of the scanned product including the aisle where the product is located. In steps 312–316, a determination is made as to whether customer assistance should be provided based on this recent scanning activity. In this regard, in step 312, a determination is made as to whether the aisle of the scanned product (the scanned aisle) corresponds to the current aisle. If the answer is NO, a determination is made in step 314 as to whether the scanned aisle corresponds to a previous aisle. If the scanned aisle corresponds to a previous aisle, an assumption is made that the customer is roaming the store and taking an ineffective scanning route, and the processing unit, in step 318 proceeds to dispatch a store clerk or display a message on the customer's terminal 10 for providing assistance.

If the store clerk is to be dispatched, the processing unit retrieves the customer's identification information from the customer database, and transmits this information along with the last scanned aisle number, to the store clerk's handheld terminal or store terminal 24.

If the customer is to be inquired about the need for assistance, the processing unit transmits to the customer's mobile personal shopping terminal 10 a message to this effect. The customer may select a YES key on the terminal to accept the offer for assistance. The store clerk is dispatched to the customer upon the selection of such a YES key.

Referring again to steps 312 and 314, if the scanned aisle does not correspond to either the current aisle or any of the previous aisles, then the customer has moved to a new aisle. Thus, in step 316, the processing unit moves the aisle that is stored as the current aisle into the previous aisle list, and sets the new scanned aisle as the current aisle. The process then returns to step 306 to record the next scan activity.

Figure 6B:
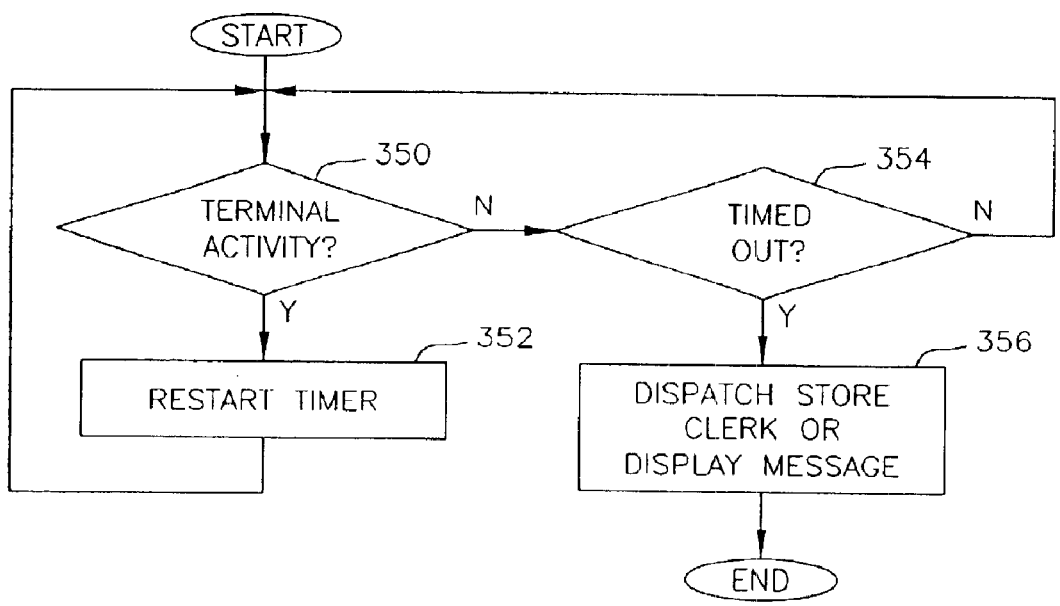
FIG. 6B is a flow diagram of a process for identifying and providing assistance to shoppers detected by the network server of FIG. 5 as potentially needing such assistance according to another embodiment of the invention.

FIG. 6B is a flow diagram of a process for identifying and providing assistance to shoppers detected by the network server of FIG. 5 as potentially needing such assistance according to another embodiment of the invention. According to this process, an activity by the mobile personal shopping terminal 10 is detected in step 350 and a timer is either started or re-started in step 352. The timer may be similar to the scanning interval timer 58 of FIG. 1. The terminal activity may be a scanning activity, or any other activity performed using the mobile personal shopping terminal 10, such as accessing service provided by the network server 12 via the terminal.

If a terminal activity is not detected in step 354, a determination is made as to whether the timer has timed-out. This determination may be made by comparing the timer with a set threshold time, and determining if the timer has exceeded the threshold time. If the timer has timed-out without a terminal activity, an assumption is made that the customer may be in need of assistance. Thus, the network server 12, in step 356, proceeds to dispatch a store clerk or display a message on the customer's terminal 10 for providing the assistance to the customer.

III. Mobile Kiosk Features

According to one embodiment of the invention, kiosk functions are incorporated into the mobile personal shopping terminal 10 for providing to the shopper more information and more business opportunities with the retail store. According to one embodiment of the invention, the mobile personal shopping terminal 10 provides to the customer various services that the customer may take advantage of while shopping in the store. Such services include, but are not limited to access to the retailer's website or another site hosted by the network server 12, access to advertisement clips and coupons of products sold by the retailer, access to community information and news, and access to recycling shopping and in-store auctions. By providing such services via the mobile personal shopping terminal 10 in addition to the traditional services, a retailer may keep existing customers and attract new customers to its site.

Figure 7:
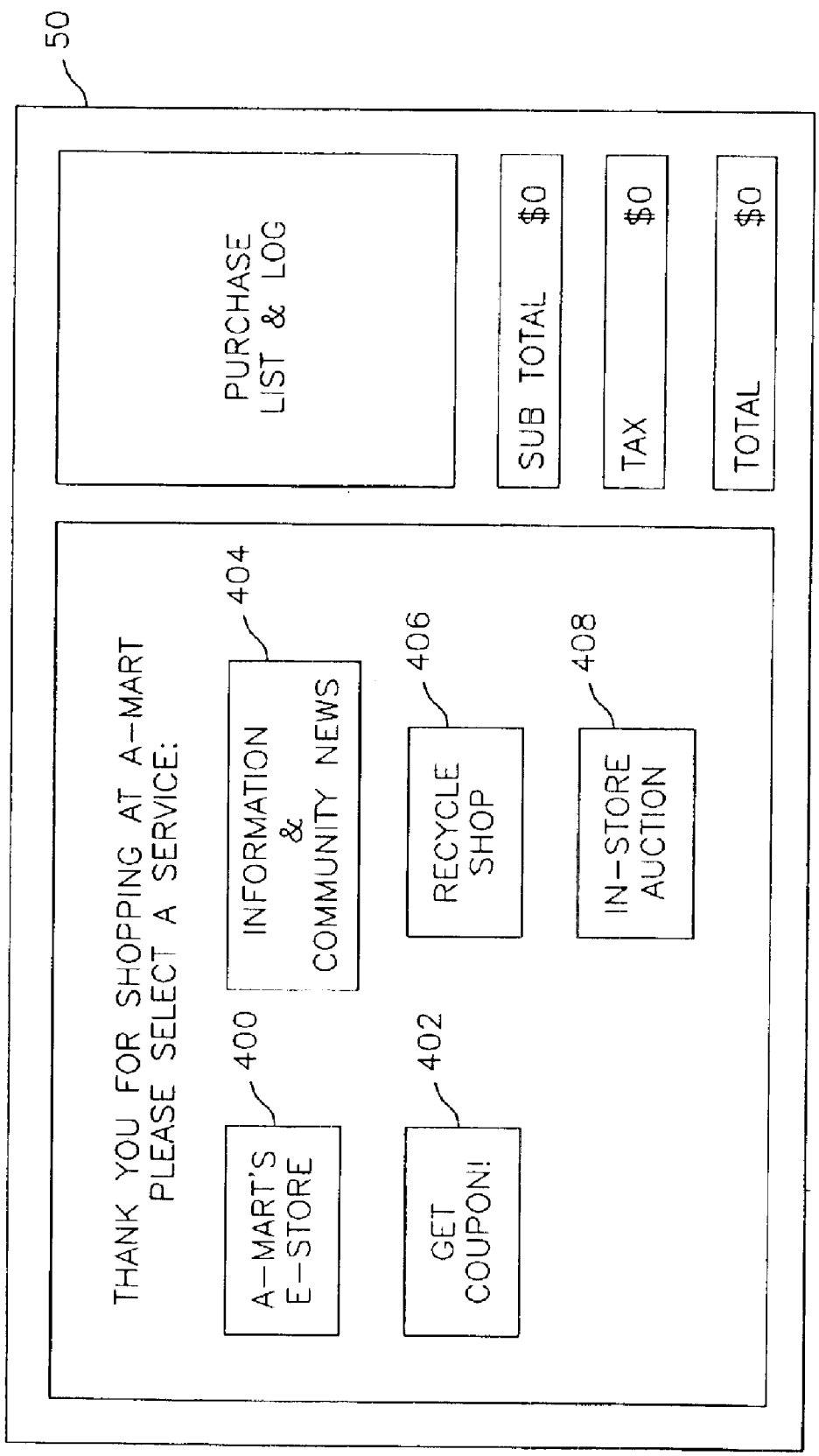
FIG. 7 is a schematic layout diagram of a graphical user interface that allows a customer to access various services provided by a retailer via the mobile personal shopping terminal of FIG. 2 according to one embodiment of the invention.

FIG. 7 is a schematic layout diagram of a graphical user interface that allows a customer to access various services provided by the retailer via the mobile personal shopping terminal 10 according to one embodiment of the invention. Selection of button 400 allows the customer to access the retailer's website for browsing the site while shopping at the physical store. According to one embodiment of the invention, the customer may interact with the website via the mobile terminal 10 as he or she would from home via a personal computer or the like.

Selection of button 402 causes the retrieval of an advertisement from the advertisement database in the mass storage device 32. The advertisement may include video, text, and/or graphics of a product or service that is being advertised. The advertisement may allow the customer to retrieve a coupon associated with the advertised product or service, and print it using the printer 72 for redeeming at the store.

Selection of button 404 allows the customer to view information and news associated with a particular community. Such information is retrieved from the news database of the mass storage device 32 and displayed to the customer in the form of video, text, and/or graphics.

Selection of button 406 allows the customer to invoke a recycling shopping feature where the customer may buy and sell recycled, used, and/or repaired goods using the retailer as the intermediary. Items placed for rent may also be viewed via the recycling shopping feature.

A seller may select the recycling shopping feature to post information about an item that he or she wishes to sell or rent. Such information may include a product description and a suggested selling/rental price. The information is transmitted to the network server for storing in the recycled goods database of the mass storage device 32.

A buyer may select the recycling shopping feature to view items in the recycled goods database. If the customer is interested in a particular item, the customer may select on the item and retrieve a more detailed information about the item. The information may be provided in the form of video, text, and/or graphics. The customer may also purchase/rent the item being viewed using the mobile personal shopping terminal 10.

According to one embodiment of the invention, the retailer receives an intermediation fee from the seller upon the sale/rental of the product. The retailer may also provide for pickup and delivery services using their existing logistics capability, upon the payment of a fee. According to one embodiment of the invention, dates for delivery and/or pickup are scheduled via the mobile personal shopping terminal 10. Any fees associated with the sale or purchase of a recycled item are added to the total of a current purchase transaction and paid by the customer during checkout.

Selection of button 408 causes the customer to invoke an in-store auction service. Similar to the recycling shopping feature, the in-store auction service allows sellers and buyers to conveniently sell and purchase goods using the retailer's existing infrastructure and capabilities. However, unlike the recycling shopping feature where a set price is given for a particular item or service, the items and services listed for the in-store auction service are auctioned off to a highest or lowest bidder, as the situation may be. The actual bidding of the items/services may be done using the mobile personal shopping terminal 10 while the customer is shopping in the store.

Figure 8:
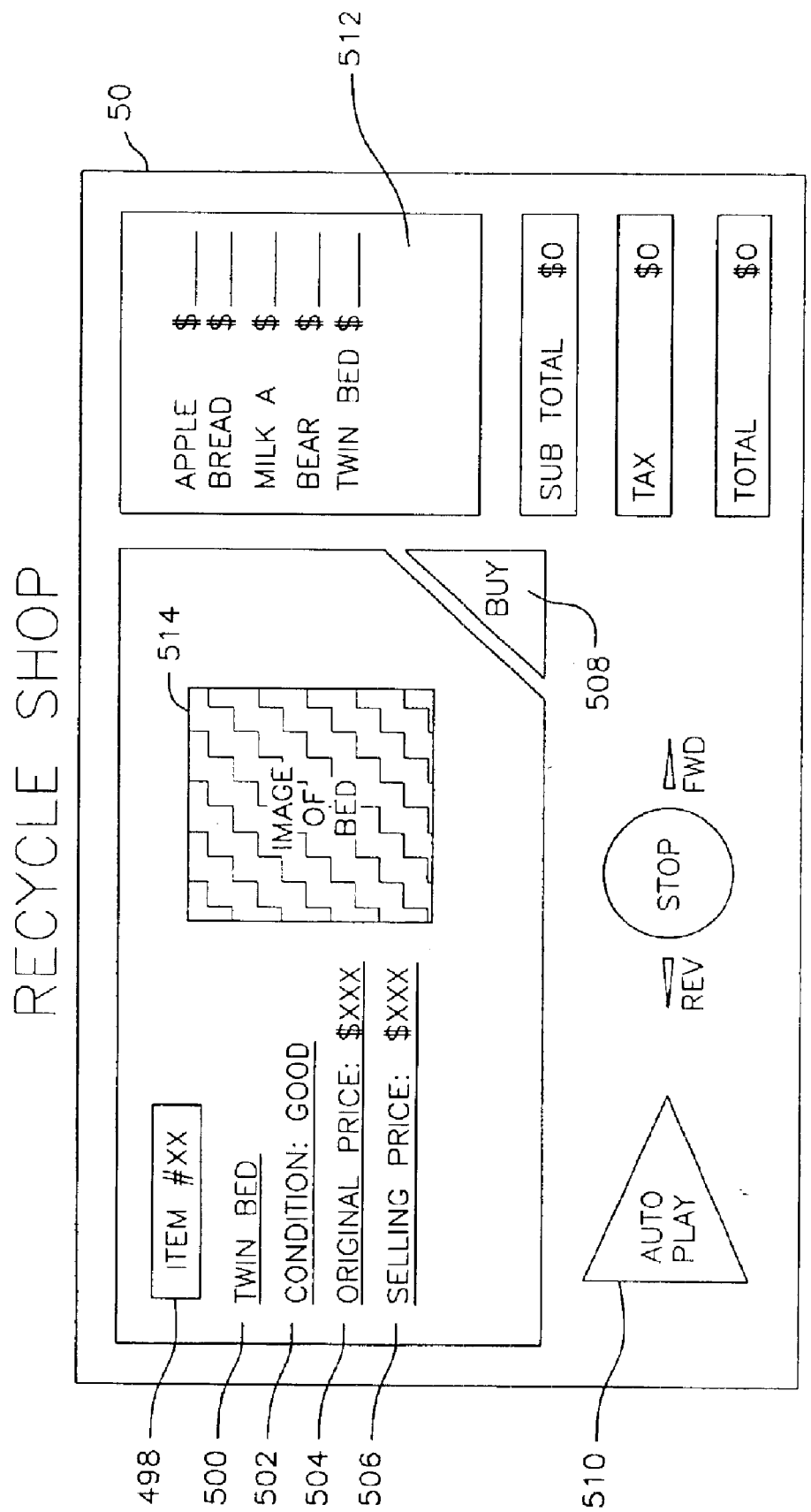
FIG. 8 is a schematic layout diagram of a display for recycling shopping according to one embodiment of the invention.

FIG. 8 is a schematic layout diagram of a display for recycling shopping according to one embodiment of the invention. An item number 498 indicates the ID number of the item that is being offered for sale. A written description of the item is provided in a description field 500 of the display. Along with a written description, the display screen 50 may also display a picture 514 of the item that is being sold. In addition, the description of the item may be provided in an audio or video recording upon the selection of the appropriate buttons 510.

Other information provided for the item may include the condition 502 of the item that is being sold as well as the original price 504 of the item. A selling price 506 that is requested by the seller is also displayed on the display screen 50. If a buyer wants to purchase the item that is displayed, he or she selects a buy option 508 on the mobile personal shopping terminal 10. According to one embodiment of the invention, selection of the buy option 508 causes the item to be included into a list of items 512 that have been self-scanned by the customer using the mobile terminal 10 during a current shopping transaction. Payment for the item may then be made during checkout while paying for the self-scanned items.

Figure 9:
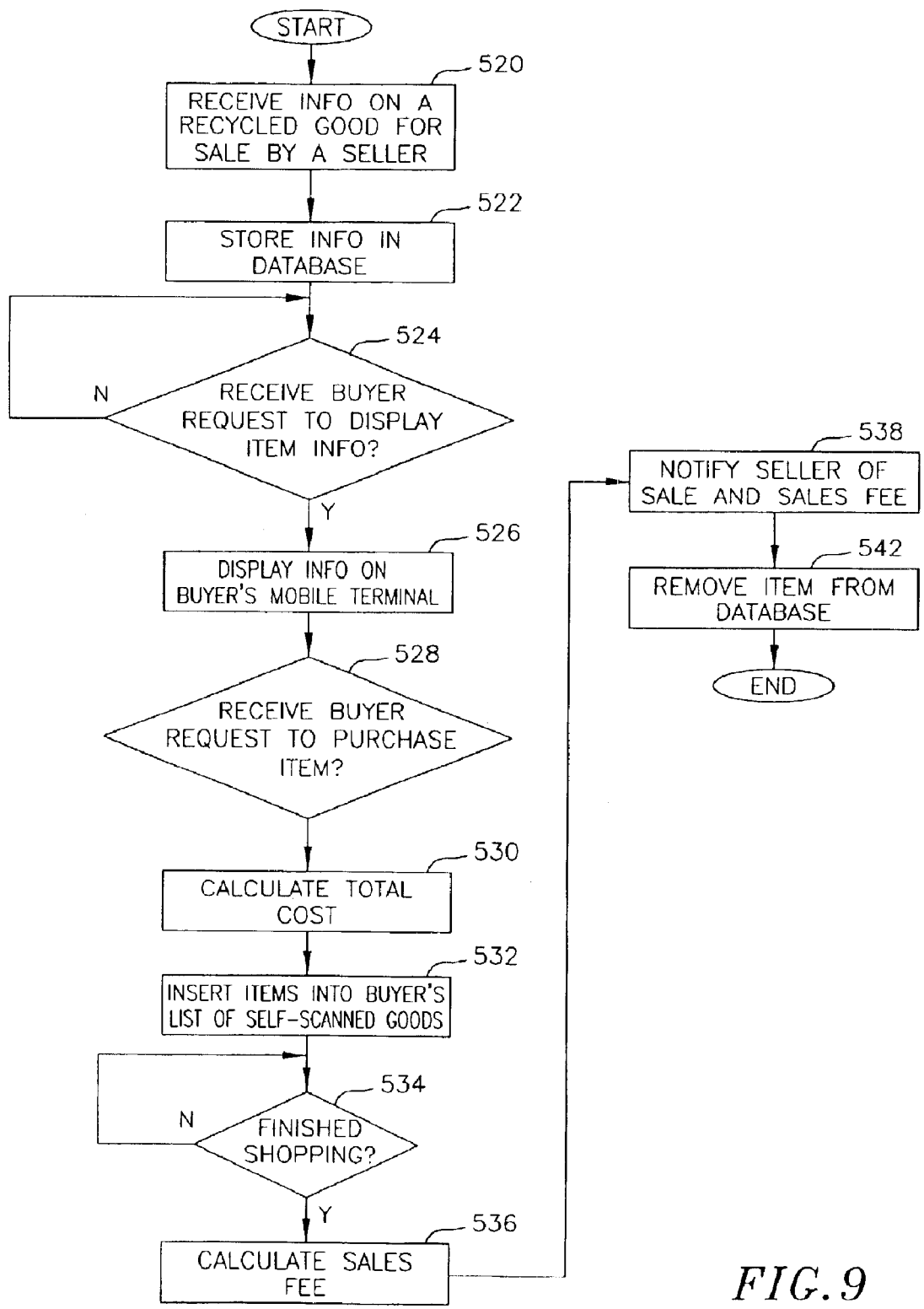
FIG. 9 is a flow diagram of a process for providing a recycling shopping feature via the mobile personal shopping terminal of FIG. 2 according to one embodiment of the invention.

FIG. 9 is a flow diagram of a process for providing the recycling shopping feature according to one embodiment of the invention. The process starts, and the network server 12 receives from a seller's mobile terminal, information on a recycled item to be offered for sale. The information may include a description of the item as well as a sales price of the item. In step 522, the network server 12 stores the information in the recycled goods database of the mass storage device, along with the appropriate seller information. The seller information may be obtained from the customer database maintained by the network server 12 or from an IC card provided by the seller.

In step 524, the network server 12 receives from a buyer's mobile terminal, a request to display information on the recycled good that has been placed for sale by the seller. In step 526, the information is displayed on the buyer's mobile terminal. In step 528, the buyer's mobile terminal receives the buyer's request to purchase the item. This occurs, for example, upon the buyer's selection of the purchase option 508 from the display screen 50. In step 530, the total cost of the recycled item is calculated by either the network server's processing unit or the mobile terminal's control unit 56. In doing so, any shipping, handling, and/or delivery fees appropriate for the item are calculated in addition to the actual sales price of the item.

In step 532, a description of the recycled item is inserted into the list of purchase items 512 that have been self-scanned by the buyer for purchase along with the item's sales price and any shipping, handling fee, and/or delivery fee associated with the item. In step 534, a determination is made as to whether the buyer has indicated that he/she has finished shopping, such as, for example, by selecting a checkout option on the mobile terminal and making a payment of the purchased items. If the answer is YES, the network server 12 calculates any sales fee to be accessed to the seller. This may be, for example, a percentage of the listed sales price of the item. The network server 12 then notifies the seller of the sale of the recycled item along with the sales fee assessed. The notification may be via e-mail or any other communication mechanism conventional in the art. In step 542, the network server 12 proceeds to remove the record for the sold item from the recycled goods database.

According to one embodiment of the invention, another service provided by the retailer is the ability for a customer to purchase an audio piece that is currently being broadcast at the store using the mobile personal shopping terminal 10 As an audio piece is being broadcast via the store's broadcast system, information on the audio piece is displayed on the terminal's display screen 50. The customer is given the option to purchase the audio piece using the mobile terminal 10 as the audio piece is being broadcast.

Figure 10:
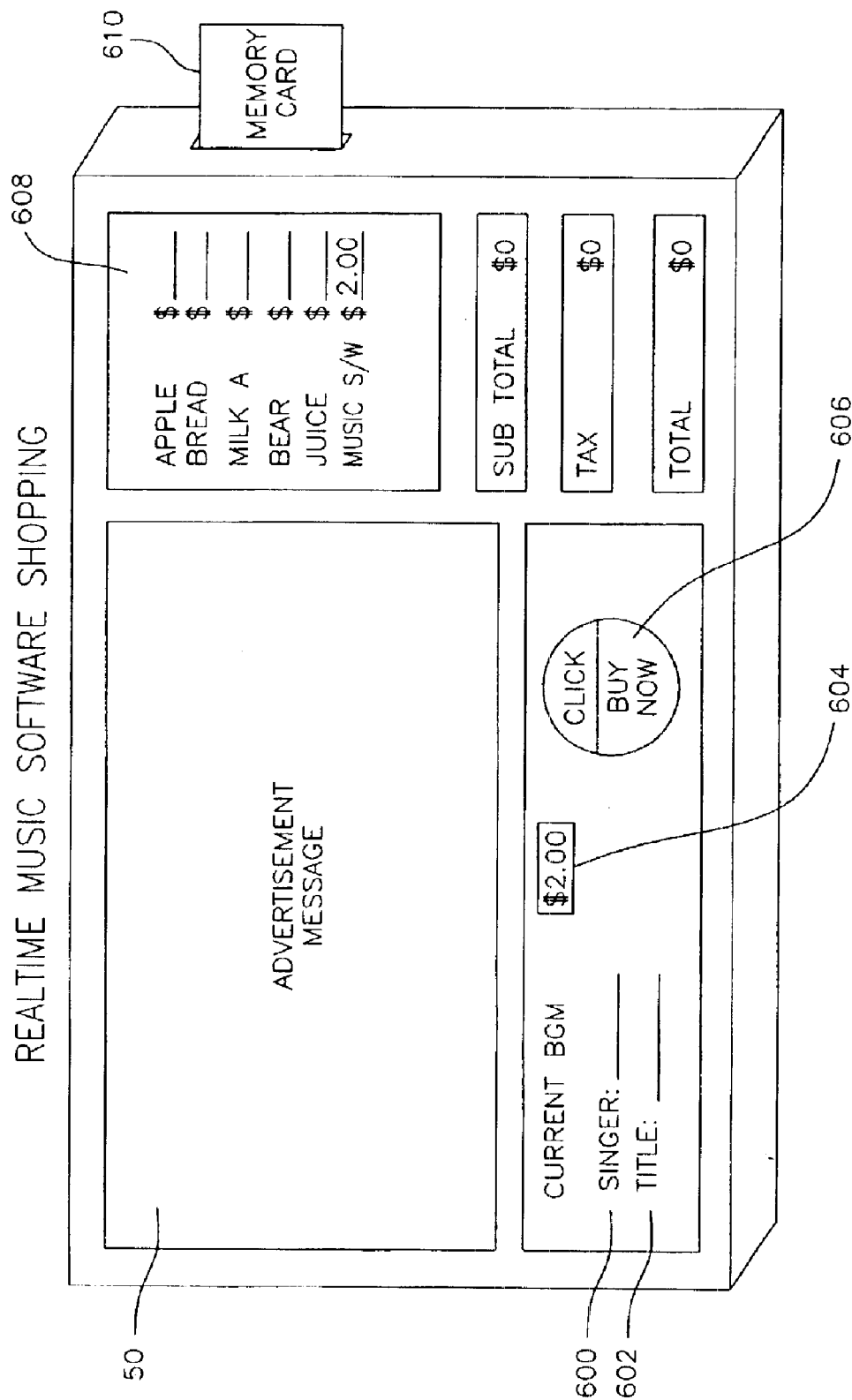
FIG. 10 is a schematic layout diagram of a graphical user interface provided by the mobile personal shopping terminal of FIG. 2 for allowing the purchase of a currently broadcast audio piece according to one embodiment of the invention.

FIG. 10 is a schematic layout diagram of a graphical user interface provided by the display screen 50 of the mobile personal shopping terminal 10 for allowing the purchase of a currently broadcast audio piece according to one embodiment of the invention. The network server 12 maintains in a music database information on audio pieces that are available for sale as well as the actual media file for such audio pieces.

According to one embodiment of the invention, the network server retrieves from the music database an audio piece to be broadcast by the store's broadcast system. Such a broadcast system is coupled to the network server 12 and includes all components that are conventional in the art that are needed for the broadcast.

Upon the broadcast of the selected audio piece, the network server 12 transmits information about the audio piece to all the mobile terminals that are currently in use. Such information may include the singer 600, title 602, and sales price 604 of the audio piece that is being broadcast. According to one embodiment of the invention, the selection of a buy option 606 on the display screen 50 allows the customer to purchase the broadcast audio piece. Upon the selection of such a buy option, purchase information on the audio piece is included into a list of purchase items 608 that have been scanned by the customer using the mobile terminal 10 while shopping at the store. Payment for the audio piece may then be made during checkout while paying for the self-scanned items.

The retailer may transmit the audio file corresponding to the purchased audio piece to the customer's e-mail address after completion of the purchase transaction. Alternatively, the audio file may be downloaded to the local storage 60 of the mobile personal shopping terminal 10 or the customer's IC card, during or prior to checkout.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A mobile shopping terminal comprising:
a control unit; and
a scanner coupled to the control unit, characterized in that the control unit retrieves profile information associated with a user, identifies a time period based on the profile information, detects a first scanning activity by the scanner, and disables the scanner for the identified time period in response to detecting the first scanning activity prior to enabling a second scanning activity.

2. The mobile shopping terminal of claim 1 further comprising a display for displaying a list of self-scanned items, wherein a duplicative item on the list is visually distinguished from other items on the list.

3. The mobile shopping terminal of claim 1, wherein the profile information includes information on the user's self-scanning experience.

4. The mobile shopping terminal of claim 3, wherein the time interval decreases with increase in the user's self-scanning experience.

5. A store server for use in a retail facility, the store server comprising:

means for recording an activity of a mobile shopping terminal used by a user;
a processing unit coupled to the means for recording, the processing unit configured to analyze the activity and determine whether assistance should be provided to the user based on the analyzed activity; and
a means for transmitting user profile information to a store terminal accessible to a store clerk in response to a determination that assistance should be provided to the user, the user profile information including data for identifying the user to whom assistance is to be provided.

6. The store server of claim 5, wherein the activity is a scanning activity conducted with a scanner coupled to the mobile shopping terminal.

7. The store server of claim 5, wherein the processing unit is configured to analyze a time period associated with the activity.

8. The store server of claim 5, wherein the processing unit is configured to analyze a location associated with the activity.

9. The store server of claim 5 further comprising means for transmitting a message for display on the mobile shopping terminal, the message inquiring whether assistance is desired by the user.

10. The store server of claim 5 further comprising means for transmitting to the store terminal location information associated with the user.

11. The store server of claim 5, wherein the processing unit is configured to determine a shopping route based on the activity.

12. The store server of claim 11, wherein the processing unit determines that assistance should be provided to the user if the shopping route is determined to be an ineffective shopping route.

13. In an electronic shopping system for use in a retail facility, the electronic shopping system comprising:
a store computer maintaining information on a plurality of audio pieces;
a broadcast system broadcasting an audio piece selected by the store computer; and
a mobile shopping terminal including:
a scanner for self-scanning of items desired for purchase by a user;
means for receiving from the store computer information on the audio piece broadcast by the broadcast system;
a user input receiving a user command to purchase the broadcast audio piece; and
a control unit inserting the audio piece into a list of items that have been self-scanned by the user in response to the user command.

14. The system of claim 13 further comprising means for delivering the audio piece to the user.

15. The system of claim 14 further comprising a memory unit coupled to the mobile shopping terminal, wherein the means for delivering includes a means for storing the audio piece in the memory unit.

16. In an electronic shopping system including a mobile shopping terminal coupled to a scanner, a computer-implemented method for controlling use of the scanner by a user, the method comprising:
retrieving profile information associated with the user;
identifying a time period based on the profile information;
detecting a first scanning activity by the scanner; and
disabling the scanner for the identified time period in response to detecting the first scanning activity prior to enabling a second scanning activity.

17. The method of claim 16, wherein the profile information includes information on the user's self-scanning experience.

18. The method of claim 16, wherein the time interval decreases with increase in the user's self-scanning experience.

19. A computer-implemented method for providing aid to a user of a mobile shopping terminal coupled to a scanner, the method comprising:

recording an activity of the mobile shopping terminal;

analyzing the activity by a processing unit;

determining whether assistance should be provided to the user based on the analyzed activity; and transmitting user profile information to a store terminal accessible to a store clerk in response to a determination that assistance should be provided to the user, the user profile information including data for identifying the user to whom assistance is to be provided.

20. The method of claim 19, wherein the activity is a scanning activity conducted with the scanner.

21. In an electronic shopping system having a store computer coupled to a database and a broadcast system, and a mobile shopping terminal accessible to a user, the database storing information associated with a plurality of audio pieces and the mobile shopping terminal being coupled to a scanner and a display, a method for electronic shopping via the mobile shopping terminal, the method comprising:

broadcasting via the broadcast system an audio piece selected by the store computer;

receiving from the store computer information on the audio piece broadcast by the broadcast system;

displaying the information on the display;

displaying on the display a list of items that have been self-scanned by the user using the scanner;

receiving a user command to purchase the broadcast audio piece; and inserting the audio piece into the list of items that have been self-scanned by the user in response to the user command.

* * * * *